Sept. 27, 1966         G. B. FEILD         3,275,730
     METHOD AND APPARATUS FOR ORIENTING AN
          EXTRUDED POLYMERIC WIRE COATING
               Filed Dec. 24, 1962
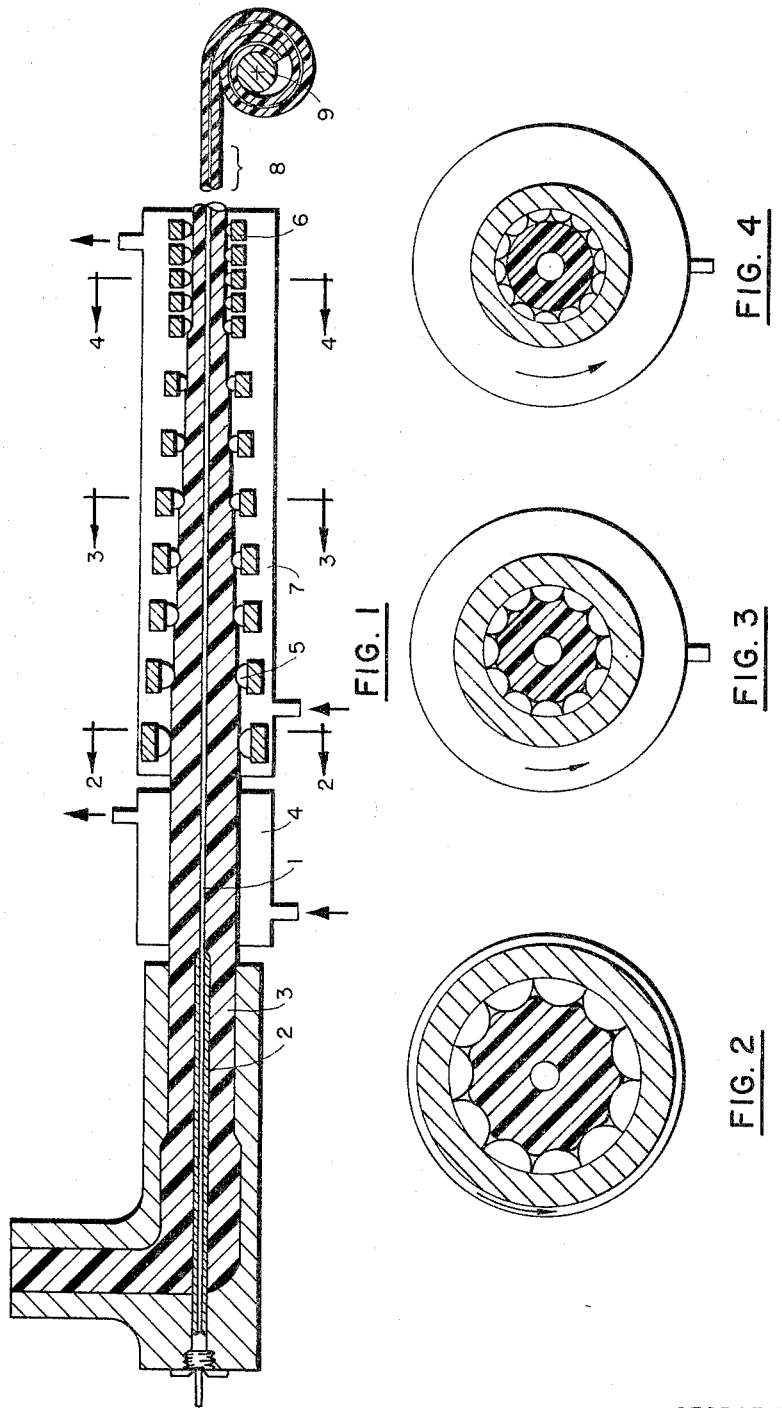
GEORGE B. FEILD
  INVENTOR.
BY  Ernest G. Petersen
                    AGENT

United States Patent Office 3,275,730
Patented Sept. 27, 1966

3,275,730
METHOD AND APPARATUS FOR ORIENTING AN EXTRUDED POLYMERIC WIRE COATING
George B. Feild, New Castle, Del., assignor to Hercules Incorporated, a corporation of Delaware
Filed Dec. 24, 1962, Ser. No. 246,739
11 Claims. (Cl. 264—174)

This invention relates to an improved method and apparatus for applying a plastic coating to a metal wire or like filamentary articles.

Many crystalline thermoplastic polymers have good dielectric properties, chemical resistance, and the like, which would make them extremely well suited for use as wire coating materials, but they are deficient in tensile strength, abrasion resistance and low temperature flexibility. In order to improve these deficient properties and thus realize the maximum benefits to be derived from the use of these materials as wire coatings, it is desirable that the polymers be molecularly oriented. Although processes are known for applying an oriented plastic coating to wire, the processes have not been commercially successful for a variety of reasons.

It is known that molecular orientation can be accomplished by subjecting an orientable polymer that has been properly conditioned to an elongating force. The elongating force can be applied, as in the manufacture of film and fibers, e.g., by drawing the polymer from a feed roll to a draw roll which is driven at a greater speed than the feed roll, the difference in speed between the rolls exerting the necessary force to draw and molecularly orient the polymer. It is obvious that such a method would be inapplicable to the coating on a wire or other filamentary article except in cases where it is desired to draw the wire simultaneously with the polymer coating. Drawing of the wire in this manner can only be accomplished with the more ductile metals such as copper and aluminum. In these instances, the properties of the metals are rendered undesirable due to work hardening of the metal on drawing.

The prior art also discloses the production of oriented flat films of thermoplastic polymers by rolling a relatively thick sheet of the polymer in a calender to form a thinner sheet. The thickness reduction results in the desired elongation and molecular orientation. The use of a calender to produce an oriented coating on a wire is also not possible since the calender, being constructed of rollers, is capable only of producing at flat film.

Accordingly, it is an object of this invention to provide a new and improved method and apparatus for applying an oriented polymer coating to a wire. A particular object of the invention is to provide a method and apparatus for orienting the polymer coating while it is in contact with the wire to be coated.

The invention is based upon the discovery that a coating of an orientable thermoplastic polymer on a wire can be oriented by passing the coated wire internally through a series of radial ball bearings having gradually decreasing internal diameters to effect rolling of the polymer coating. The ball bearings used are of the angular contact type which in normal use utilize a rotating shaft as the inner race.

The process of the invention is practiced in conjunction with extrusion of a coating of molten polymer on the wire and comprises the steps of drawing a wire through an axially bored wire coating die and extruding a sheath of a molten orientable thermoplastic polymer around the wire at a rate less than the linear velocity of the said wire, cooling the molten polymer to below its melting point, thereafter passing the coated wire through a series of radial ball bearings of gradually diminishing internal diameter while the polymer is at a temperature above its softening point to effect rolling of the polymer coating, thereby orienting the polymer.

The apparatus of the invention comprises, in combination, a wire coating die, a series of radial ball bearings of gradually decreasing internal diameter disposed axially with respect to said die, and means for pulling a coated wire through said die and ball bearings. Means for cooling the polymer for temperature conditioning of the polymer within the bearing assembly may optionally be provided if the nature of the polymer to be worked requires such temperature conditioning.

In the accompanying drawing,

FIG. 1 is a schematic view of apparatus for applying and orienting a coating according to this invention.

FIG. 2 is a cross section view taken at location 2 of FIG. 1.

FIG. 3 is a cross section view taken at location 3 of FIG. 1.

FIG. 4 is a cross section view taken at location 4 of FIG. 1.

The apparatus depicted in FIG. 1 for carrying out the process of the invention comprises a conventional wire coating die 2, a cooling chamber 4, radial angular contact ball bearings 5 of decreasing internal diameter and polishing bearings 6, within an enclosed temperature conditioning chamber 7, a hardening zone 8, and wire take up equipment 9.

In the practice of the invention a wire 1 is drawn through the wire coating die 2. A coating 3 of a molten, orientable thermoplastic polymer such as, e.g., polyethylene, stereoregular polypropylene, polystyrene, poly(bischloromethyl oxetane), or other orientable thermoplastic polymer, is extruded by an extruder (not shown) through the die to form a sheath around the wire. The wire is drawn through the die at a rate of speed greater than the linear rate of extrusion of the polymer. For instance, the wire may be traveling at a rate of up to about 6 times the linear speed of the extruded polymer or even more.

From the coating die, the coated wire passes into the cooling chamber 4 wherein the extruded molten polymer is cooled from the melt to the desired temperature and physical state for subsequent operations. The cooling chamber encloses the area from the die to the beginning of the bearing section. Any medium, i.e., gas or liquid, capable of freezing the polymer may be used, the choice will depend on the temperature desired. The temperature in chamber 4 is maintained at a level that causes the polymer to solidify but at which the polymer remains sufficiently soft to permit the wire to be drawn through the polymer mass and thus effect orientation as it is rolled by the radial ball bearings. The choice of temperature for the operation is controlled by the molecular weight and other characteristics of the particular polymer being worked. For instance, stereoregular, i.e., isotactic, polypropylene is most advantageously worked at temperatures of from about 115 to 165° C., depending on its molecular weight whereas poly(bis-chloromethyl oxetane) is easily worked at room temperature if it has been quenched rapidly to that point from the melt. In all cases, the temperature is that which is recognized in the art to be satisfactory for working a particular polymer to impart orientation and which will permit the wire to be drawn through the polymer mass.

The cooling chamber is an optional feature of the invention which permits attainment of the proper temperature of the plastic coating in a relatively short space. With some polymers, this chamber can be dispensed with by adjusting the distance between the die and the first set of ball bearings to permit the coating to cool in the ambient air.

In other cases, it may be desirable to accomplish the temperature conditioning in more than one operation. For instance, some polymers are more readily worked if they have been quenched rapidly from the melt and then reheated to the optimum working temperature. In this situation, two temperature conditioning chambers would be required. The first chamber would be a rapid cooling or quenching chamber and the second chamber would merely bring the polymer back up to optimum working temperature and maintain that temperature during the rolling and orienting step.

Within the chamber 7 the polymer coating is oriented by passing the coated wire through a series of radial ball bearings 5 of regularly diminishing inside diameter. These bearings, which can be lubricated by means of a heat resisting silicone lubricant, are so sized and graduated that drawing of the coated wire through and in contact with them rolls the coating to a smaller diameter in regular step-wise increments.

Since the wire is traveling and being drawn through the polymer at a faster linear rate than the polymer as it leaves the die and prior to its entry into the bearing section, the polymer is distributed over a longer length of wire and is thus prevented from "backing up" or "piling up" at the entrance to the bearing section as it is rolled out to a lesser thickness. When the correct relationship is achieved between polymer extrusion rate, linear velocity of the wire and draw-down ratio (i.e., ratio of entering to exiting coating thickness), the wire and its polymer coating will be traveling at the same speed when the coated wire emerges from the bearing section and the polymer coating will have been oriented.

Since the thickness reduction of the coating is being accomplished by the use of ball bearings which cannot contact the entire surface of the coating, the coating is pressed inward causing some lateral orientation and non-uniformity of the surface upon leaving a particular bearing, i.e., the wire coating is not perfectly round and smooth. To reduce this non-uniformity and to increase lateral orientation, the size of the balls in successive bearings is regularly diminished so that a progressively greater area of the periphery of the coating is contacted by the individual balls. However, this is not alone sufficient to remove all the non-uniformity where each rolling step is effected by a single bearing. To complete the smoothing and rounding of the coating, the final rolling step comprises passing the coated wire through a series of closely spaced radial ball bearings 6 of the same size, and slightly smaller in diameter than the last of the preceeding bearings. These small bearings, which are termed "polishing bearings," effect the final increment in thickness reduction and eliminate the remaining non-uniformity, producing an essentially uniform smooth coating. Since it is not necessary in all cases that the final coating be smooth and uniform, the use of the polishing bearings is an optional feature of the invention.

After leaving the polishing bearings, the wire passes to the take-up equipment 9 where it is wound onto reels. The wire take-up equipment 9 in the process of winding the wire also serves as means for pulling the wire through the die and ball bearing assemblies.

Another conditioning chamber can optionally be provided in the span 8, between the end of the bearing section and the take-up equipment 9 for the purpose of hardening the polymer coating after it leaves the bearing section. In most cases, this chamber is not necessary since the span can easily be made long enough that ambient air will provide all the cooling necessary.

The invention is illustrated but not limited by the following specific examples.

*Example 1*

Using conventional wire coating and take-up equipment, a 14 gauge (0.064 in.) copper wire is drawn through a wire coating die at a rate of 100 ft./min. and a 0.008–0.010 in. coating of molten stereoregular polypropylene having a weight average molecular weight of 350,000 and a crystalline melting point of 168° C. is applied thereto (total diameter 0.080–0.084 in.). This coated wire is threaded through the cooling chamber and a series of radial ball bearings similar to that shown schematically in FIG. 1. This assembly consists of a series of 15 radial ball bearings decreasing in inside diameter in regular increments of 0.002 in. from 0.114 in. to 0.084 in. When the coated wire has been threaded through the bearing assembly and is running freely through the hardening zone and onto the take-up equipment, the extruder speed is increased until a coating thickness of 0.025 in. (total diameter 0.114 in.) is obtained at the die. Simultaneously, the linear velocity of the wire is increased until there is no backing up of the polymer at the entrance of the bearing assembly. At this point the wire is traveling at a rate of about 300 ft./min. The 0.025 in. coating applied at the die is reduced to 0.010 in. with no external cooling of the plastic coating until after it has passed through the bearing assembly.

The final rolling step comprises passing the wire through a series of 5 closely spaced radial ball bearings each having an internal diameter of 0.085 in. In addition to completing the thickness reduction, these bearings polish the coating, removing any remaining thickness non-uniformity. The result is an essentially uniform 0.010 in. coating of stereoregular polypropylene with a low order of orientation in the direction of the wire as evidenced by birefringence measurements.

When the process has been stabilized, with the coating being drawn through the apparatus without external cooling, and with no back-up of polymer at the entrance to the first bearing, the temperature in the cooling chamber 4 is gradually cooled by injecting cold air at an increasing rate until the wire coating is cooled to a condition which on rolling in the bearing assembly results in a high degree of orientation as determined by birefringence measurements on the finished wire and confirmable by X-ray. The exact tempreature of the plastic coating can not be measured but is probably close to the temperature of the exhaust air from the cooling chamber which is approximately 140° C. The temperature of the chamber 7 enclosing the bearing assembly is accordingly maintained at 140° C.

Improved low temperature flexibility of the oriented coating of this example is demonstrated by wrapping the coated wire around a ¼-inch mandrel mechanically driven at a rate of 6 r.p.m. at successively lower temperatures until the insulation is observed to crack. The oriented coating, applied according to the example, will survive about six turns around the mandrel at −40° C. and cracks on the second turn at −50° C. A wire with an essentially unoriented coating of the same thickness, prepared by a conventional process, will crack on the first turn at −10° C.

Tensile strength of a coating, stripped from a wire, is a measure of toughness, abrasion resistance and durability of the coated wire. When tested at room temperature on an Instron tensile testor, the oriented coating, applied in the example, has a tensile strength of about 21,000 pounds per square inch. The strength of a conventionally applied coating is only about 6,500 p.s.i.

*Example 2*

Using the same extrusion equipment and roller bearing assembly described in Example 1, a 14 gauge steel wire is drawn through the die at a rate of 100 feet per minute and a 0.008–0.010 in. coating of poly(3,3-bis-chloromethyl oxetane) having a molecular weight of 250,000 is applied thereto. The subsequent operations in applying an oriented coating to the wire are the same as described in Example 1 except that the coating is quenched with water at about 25° C. in the conditioning chamber 4, rolled at about 25° C. in the bearing assembly and subsequently hardened at 100° C. with steam using the optional conditioning chamber described above in the span 8 before reaching the take-up equipment. This polymer, when quenched to 25° C. and oriented, assumes a soft rubbery character which does not permit the coated wire to be wound up. The steam treatment in the hardening zone crystallizes and hardens the polymer to permit winding up of the wire.

The brittle temperature, by the test described in Example 1, is about −40° C., compared to 0° C. for an unoriented control. Tensile strength of the coating is increased from about 5950 p.s.i. for the control to about 17,400 p.s.i. for the oriented coating of poly(3,3-bischloromethyl oxetane).

The amount of orientation imparted to the polymer is a function of three interrelated variables, (1) the linear velocity of the wire, (2) the rate of extrusion of the polymer, and (3) the draw-down effected by the ball bearings. While the process is subject to variation through a wide range of conditions, it can be seen that in order to maintain a balanced system—i.e., wire and coating moving at equal speed at the outlet of the bearing section with no backing up of the polymer at the inlet of the bearing section—a change in one variable must be accompanied by a change in at least one of the other variables. For instance, the example has described a 2.5 to 1 reduction in thickness of the coating in 15 increments of 0.001 in. If a greater thickness reduction is desired, this can be accomplished by adding another bearing and decreasing the diameter of the polishing bearings to less than the 0.084 in. shown in the example. But the addition of these smaller bearings must be accompanied by either an increase in the linear velocity of the wire or a decrease in the extrusion rate of the polymer to prevent "backing up" of the polymer at the entrance to or within the bearing section. Conversely, if a decrease in draw-down is desired, the final bearings are made larger, accompanied by a decrease in linear speed of the wire or an increase in extrusion rate of polymer so that polymer and wire are traveling at the same speed upon leaving the bearing section. If a higher production rate is desired at the same draw-down, this can be accomplished by a proportional increase in wire speed and extrusion rate.

The bearing assembly employed in the example consisted of 15 bearings which decrease the diameter of the wire and coating in increments of 0.002 inch. Neither the number of bearings nor the size of the increments represents any limitation on the process. Either may be varied to suit the particular polymer being worked or other conditions of the operation; the only limitation being that the size of the increments must be such as to permit a smooth transition from the thick, unoriented state to the thinner, oriented state.

The orientation of the coatings applied in the examples is predominantly in the direction of the wire with some lateral orientation imparted by the pressure of the balls. An increase in the extent of the transverse orientation can be effected by rotating these radial bearings about the axis of the wire either in alternating directions of the adjacent bearings or all bearings in the same direction.

The spacing of the bearings is not critical. However, for the sake of convenience, it is desirable to have them relatively close together. In this way, the space required to house the equipment is kept to a minimum and temperature conditioning where necessary can be accomplished more efficiently.

The examples show the process applied to coatings of stereoregular polypropylene and poly(3,3-bischloromethyl oxetane) on single strands of copper and steel wire. However, it is equally applicable to any other orientable thermoplastic polymer and other metal wires such as aluminum, tinned copper, etc., either as single strands or multiple strands. Some examples of other polymers which may be employed in this invention are polyethylene, poly(ethylene terephthalate), polyamides, poly(chlorotrifluoroethylene), poly(vinyl chloride), and poly(vinylidene chloride).

What I claim and desire to protect by Letters Patent is:

1. The method of continuously applying an oriented polymeric coating to a wire which comprises drawing the said wire through an axially bored wire coating die and extruding a sheath of a molten orientable thermoplastic polymer around and in contact with the wire, adjusting the temperature of the polymer to a range within which the polymer is solid but soft enough to permit the wire to be drawn through the said polymer and thereafter passing the coated wire through a series of radial ball bearings of gradually diminishing internal diameter to effect orientation of the polymer.

2. The process of claim 1 wherein the orientable thermoplastic polymer is stereoregular polypropylene.

3. The process of claim 1 wherein the orientable thermoplastic polymer is poly(bis-chloromethyl oxetane).

4. The process of claim 1 wherein the metal wire is copper.

5. The process of claim 1 wherein the metal wire is steel.

6. The process of claim 1 wherein the metal wire is aluminum.

7. The process of claim 1 wherein the radial ball bearings are rotated about the axis of the wire as the coating is being rolled.

8. The process of claim 1 wherein the coated wire is passed through a series of polishing bearings of the same internal diameter immediately following the series of radial ball bearings of gradually decreasing diameter.

9. Apparatus for applying an oriented polymeric coating to a wire which comprises in combination a wire coating die adapted to extrude a sheath of molten polymer around and in contact with a wire, means for adjusting the temperature of the coating material to a point where it is solid but soft enough to permit a wire to be drawn through the coating material, a series of radial ball bearings of gradually decreasing internal diameter disposed axially with respect to said die and means for pulling a coated wire through said die and ball bearings.

10. The apparatus of claim 9 wherein the series of radial ball bearings is enclosed within a temperature conditioning chamber.

11. The apparatus of claim 9 wherein a series of polishing bearings of the same internal diameter is provided immediately following the series of radial ball bearings of gradually decreasing diameter.

References Cited by the Examiner

UNITED STATES PATENTS

| | | | |
|---|---|---|---|
| 1,933,616 | 11/1933 | Canon | 117—128 |
| 2,262,716 | 11/1941 | Wolfer. | |
| 2,262,989 | 11/1941 | Conklin et al. | 264—175 |
| 2,291,670 | 8/1942 | Wiley et al. | 264—174 |
| 2,336,944 | 12/1943 | Madge et al. | 264—175 |
| 2,384,224 | 9/1945 | Williams | 264—174 |
| 2,470,763 | 5/1949 | Doyle | 117—128 |
| 2,904,846 | 9/1959 | Smith | 264—174 |
| 2,943,351 | 7/1960 | Gray | 264—174 |
| 3,205,289 | 9/1965 | Carpenter | 264—280 |

ROBERT F. WHITE, *Primary Examiner.*

ALEXANDER H. BRODMERKEL, *Examiner.*

J. R. DUNCAN, S. A. HELLER, *Assistant Examiners.*